March 29, 1960 D. F. KOENECKE ET AL 2,930,710
METAL ARTICLE WITH A CORROSION AND MARINE
BORER RESISTANT COATING
Filed April 16, 1957
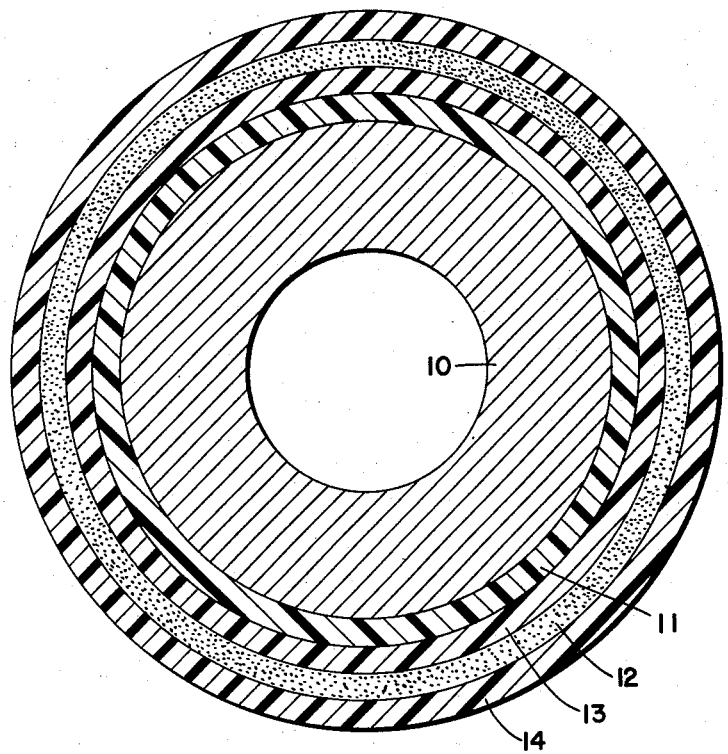
Donald F. Koenecke
Ober C. Slotterbeck
Inventors
By *CD Stone* Attorney

2,930,710

METAL ARTICLE WITH A CORROSION AND MARINE BORER RESISTANT COATING

Donald F. Koenecke, Westfield, and Ober C. Slotterbeck, Clark, N.J., assignors to Esso Research and Engineering Company, a corporation of Delaware Application April 16, 1957, Serial No. 653,126

1 Claim. (Cl. 117—26)

This invention relates to a protected metal article and more particularly relates to a laminated coating for protecting underwater metal structures against corrosion and attacks of marine borers.

The object of the invention is to provide a novel and superior protected metal article of the type wherein the metal article is protected by one or more cured polymeric hydrocarbon coatings and inert mineral layers.

Marine borers, particularly *Teredo healdi*, are extremely destructive to known coatings and protective compounds used to prevent corrosion in underwater metallic installations. Once the borer has proceeded beyond the coating down to the metal, the rate of corrosion becomes very rapid. In sea or brackish water the losses are very high since the corrosion rate about equals that of the uncoated metal within a few months after installation.

It has been found that sand, silica, alumina, or similar inert minerals form an effective barrier for the borers. For maximum effectiveness these materials should have a particle size of 45% retained on an 80 mesh screen, 32% retained on a 110 mesh screen, and 23% retained on a 200 mesh screen.

In accordance with this invention a laminated coating is prepared in which the inert materials are used to prevent access of the borers to the corrosion-preventing coat attached to the metal. A finish coat is usually desirable on top of the inert materials. Thus, in accordance with the invention a corrosion-resisting coat is first applied to the metal, then an adhesive of the same or different type is applied on top of the corrosion-resisting coat. While the adhesive coat is still tacky, a layer of inert material is applied. Finally an outer finish coat is added. In this way the borers are stopped at the inert layer which forms an effective barrier. This insulates the corrosion-resisting coating from any attack by the borers thus preserving the metal from corrosive attack.

Certain preferred details of construction together with additional objects and advantages will be apparent and the invention itself will be best understood by reference to the following specification and to the accompanying drawing which is a cross-sectional view of a protected metal article embodying the invention.

Referring now to the drawing, the protected metal article disclosed therein comprises a metal pipe 10 having secured to the outside thereof an anticorrosive coating 11, an inert mineral layer 12 bonded to the anticorrosive layer by an interposed adhesive layer 13 and a finish coat 14.

In accordance with this invention it has been found that at least one, preferably all, of the layers 11, 13 and 14, that is, the anticorrosive, adhesive and finish layers, should be composed of a polymer of a conjugated diolefin of 4 to 6 carbon atoms such as butadiene-1,3 or a copolymer thereof with a vinyl aromatic hydrocarbon such as styrene.

The polymers employed in the process of this invention include solid synthetic rubber and liquid polymer drying oils. The polymers may be prepared by any suitable means. In one such method, a liquid polymer can be prepared by solution polymerization in the presence of a finely divided alkali metal catalyst and a hydrocarbon solvent as described in U.S. Patent 2,762,851 issued September 11, 1956, to Anthony H. Gleason, the subject matter of which is incorporated herein by reference. In another method, the liquid polymer can be prepared by aqueous emulsion polymerization in the presence of relatively large amounts of mercaptan modifiers. In still another method, the liquid polymer can be produced in the presence of hydrofluoric acid as the catalyst. The polymer can also be prepared by the use of $BF_3$-ethyl ether complex catalyst as described in U.S. Patent 2,708,639, also incorporated herein by reference; or by the use of a peroxide catalyst such as t-butyl hydroperoxide as described in U.S. Patent 2,586,594 to Arundale, likewise incorporated herein by reference. Solid polymers may be prepared similarly by mass, emulsion and peroxide polymerization, e.g. GR–S (an emulsion copolymer of 75% butadiene and 25% styrene) and the like.

The polymers obtained by any of the above methods may be used as synthesized or they may be modified with maleic anhydride in accordance with the teachings of U.S. Patent 2,652,342 to Gleason issued September 15, 1953. However, they are preferably dissolved in any aliphatic or aromatic hydrocarbon solvent or mixture thereof with which they are compatible and blown with air or oxygen at temperatures between room temperature and about 280° F. (preferably 200°–260° F.) until about 5 to 20% oxygen has been incorporated in the polymer oil in accordance with the disclosures of copending application Serial No. 498,111, filed March 30, 1955, the disclosures of which are incorporated herein by reference.

The polymer films may be applied in solution or as a latex to give varnishes or may be mixed with pigments to give enamels which may be cured in accordance with the technique of this invention. Depending on the type of pigment employed and eventual use contemplated, the concentration of pigment may vary between 5 and 75% based on the weight of non-volatile polymeric constituents of the polymer in the film.

Any of the polymers described above, modified or not, are preferably cured by applying a solution of the polymer in a suitable solvent or an aqueous dispersion thereof to the surface on which it is to be cured and applying a flame, preferably nonluminous or oxidizing, of a gas burner to the coating. The flame may be applied either to the coated or uncoated side, or even to both sides simultaneously. Thus, for example, the inside of a pipe may be coated and the flame applied to the outside. In general, however, it is preferable to apply the flame directly to the coated side. The film is found to be cured in a very short time, often in about 1 second, although in some instances times up to 15 minutes might be necessary. However, 5 seconds to 4 minutes is usually sufficient. The diolefin polymer coatings are unique in their ability to be satisfactorily cured by this technique. Other coatings, such as those prepared from phenolic resins and epoxy resins blister badly when cured in this manner. The films when cured in accordance with this invention are flexible, yet hard and resistant and adhere strongly to the coated body.

The curing technique is particularly adaptable to the rapid curing of thin films on metal pipes. The coating is applied as a solution or as a latex with a brush, a felt or rubber roller, or spray, or any other convenient technique. For convenience, spray guns are most frequently used. Within 30 seconds to 5 minutes the coated pipes are exposed to a six-inch ribbon burner flame (temperature about 1000°–1100° F.) and moved through the flame with the pipe being perpendicular to the longer flame dimension. The temperature of the supporting surface at the coating interface reaches 400°–800° F. or higher as an instantaneous peak temperature, preferably 550°–600° F., then immediately drops as it passes the flame. The upper temperature limit may reach even higher than 800° F. but should always be below the ignition temperature of the film.

The advantages of the invention will be better understood from a consideration of the following experimental data which are given for the sake of illustration but without intention of limiting the invention thereto.

*Example I*

A polymer oil obtained in accordance with the teachings of U.S. Patent 2,762,851 was dissolved in Solvesso 100 (an aromatic hydrocarbon fraction boiling 322° to 351° F. and having a kauri butanol value of 93.3) and blown with air at 225°–250° F. until the oxygen content reached 9.5%. The operation was done in a 4 in. x 8 ft. steel pipe and increments of Solvesso added to replace volatilization losses. The product had a non-volatile matter (N.V.M.) content of 39%.

*Example II*

A 2" pipe sample was coated with about a 1 mil film of the oxidized oil of Example I after being preheated. Then a ribbon burner flame was used to cure the film in 1.5 minutes on a lathe. After this it was cooled and a 2 mil film of the same oil applied. In 10 minutes it was tacky and a coat of sign painter's black sand was applied. The coating was cured in 2.5 minutes exposure to the flame. A second coat was applied in the same way. Finally, two 2 mil coats of the oxidized oil were applied and flame cured 2.5 minutes each. The resulting pipe was free from coating voids according to a holiday detector. The film and sand were very tightly bound to the pipe affording protection against borers and corrosion.

The nature of the present invention having been thus fully set forth, and specific examples of the same given, what is claimed as new and useful and desired to be secured by Letters Patent is:

A protected metal article comprising a metal article provided with a laminated corrosion and toredo resistant coating comprising a first anticorrosive layer affixed to the metal, an inert layer of silica having a particle size of 45% retained on an 80 mesh screen, 32% retained on a 110 mesh screen, and 23% retained on a 200 mesh screen affixed to said first layer by an interposed adhesive layer, and an outer finish layer, said anticorrosive layer, adhesive layer and outer finish layer each consisting of an air-blown butadiene polymer containing 5 to 20% oxygen which polymer has been cured after it has been laid down as a film by subjecting the film to the direct action of an open flame in the presence of oxygen.

References Cited in the file of this patent
UNITED STATES PATENTS

| | | |
|---|---|---|
| 2,273,880 | Mitchell | Feb. 24, 1942 |
| 2,784,117 | Linden | Mar. 5, 1957 |